US010174660B2

(12) United States Patent
Mayer

(10) Patent No.: US 10,174,660 B2
(45) Date of Patent: Jan. 8, 2019

(54) METHOD FOR MEASURING CATALYTIC REACTIVITY IN DIAGNOSING A GAS-PERMEABLE OBJECT, AND APPARATUS THEREFOR

(71) Applicant: HIRTENBERGER AKTIENGESELLSCHAFT, Hirtenberg (AT)

(72) Inventor: Hanspeter Mayer, Allerheiligen (AT)

(73) Assignee: HIRTENBERGER AKTIENGESELLSCHAFT, Hirtenberg (AT)

( * ) Notice: Subject to any disclaimer, the term of this patent is extended or adjusted under 35 U.S.C. 154(b) by 241 days.

(21) Appl. No.: 15/103,612

(22) PCT Filed: Dec. 9, 2014

(86) PCT No.: PCT/EP2014/077048
§ 371 (c)(1),
(2) Date: Aug. 19, 2016

(87) PCT Pub. No.: WO2015/086597
PCT Pub. Date: Jun. 18, 2015

(65) Prior Publication Data
US 2016/0363031 A1  Dec. 15, 2016

(30) Foreign Application Priority Data
Dec. 11, 2013  (EP) ...................................... 13196688

(51) Int. Cl.
*G01M 15/10* (2006.01)
*F01N 11/00* (2006.01)
(Continued)

(52) U.S. Cl.
CPC ............ *F01N 11/002* (2013.01); *B01D 41/04* (2013.01); *F01N 3/021* (2013.01); *F01N 3/0237* (2013.01);
(Continued)

(58) Field of Classification Search
USPC .............................. 73/114.69, 114.71, 114.75
See application file for complete search history.

(56) References Cited

U.S. PATENT DOCUMENTS 5,067,320 A * 11/1991 Kanesaki ................ F01N 3/025
422/169
5,431,043 A * 7/1995 Gugel ..................... F01N 11/00
73/114.75
(Continued)

FOREIGN PATENT DOCUMENTS

DE   10 2005 060 070   6/2007
EP   2 446 952         5/2012
(Continued)

*Primary Examiner* — Eric S McCall
(74) *Attorney, Agent, or Firm* — Greenblum & Bernstein, P.L.C.

(57) ABSTRACT

Method and apparatus for measuring catalytic reactivity in diagnosing a gas-permeable object, such as a catalyst or a filter, that has been removed from an exhaust gas tract connected downstream of an internal combustion engine of, motor vehicle. The method includes applying, through an opening in a device, a test medium with a defined composition, to a front face of the removed object; and measuring, at a position located, with respect to a flow direction of the test medium, downstream of the front face, at least of: a concentration of at least one reduced or oxidized constituent of the test medium after passage of the test medium through the gas-permeable object; and a temperature of the object after the test medium is applied to the gas-permeable object.

21 Claims, 4 Drawing Sheets

(51) Int. Cl.
  *B01D 41/04* (2006.01)
  *F01N 3/10* (2006.01)
  *F01N 3/023* (2006.01)
  *F01N 3/021* (2006.01)

(52) U.S. Cl.
  CPC ............ *F01N 3/10* (2013.01); *F01N 2550/02* (2013.01); *F01N 2550/04* (2013.01); *F01N 2560/06* (2013.01); *F01N 2560/12* (2013.01); *Y02A 50/2322* (2018.01)

(56) References Cited

U.S. PATENT DOCUMENTS

| | | | | |
|---|---|---|---|---|
| 5,559,072 | A * | 9/1996 | Itoh | B01D 53/9418 502/347 |
| 5,560,200 | A * | 10/1996 | Maus | F01N 11/002 60/274 |
| 5,955,665 | A * | 9/1999 | Wienand | F01N 11/00 60/276 |
| 5,997,830 | A * | 12/1999 | Itoh | B01D 53/9418 423/213.5 |
| 6,119,451 | A * | 9/2000 | Vogtlin | B01D 53/8625 60/274 |
| 7,100,582 | B1 * | 9/2006 | Bach | F02B 43/10 123/198 DB |
| 2007/0130924 | A1 | 6/2007 | Seo | |
| 2008/0307781 | A1 * | 12/2008 | Gonze | F01N 3/027 60/320 |
| 2009/0320880 | A1 | 12/2009 | Hakansson | |
| 2011/0154808 | A1 * | 6/2011 | Hirata | B01D 53/9431 60/297 |
| 2012/0067026 | A1 * | 3/2012 | Gonze | F01N 3/035 60/274 |
| 2014/0010745 | A1 * | 1/2014 | Pfister | B01D 53/9495 423/212 |
| 2015/0292387 | A1 * | 10/2015 | Nishioka | F01N 9/005 422/178 |

FOREIGN PATENT DOCUMENTS

| | | |
|---|---|---|
| EP | 2 543 836 | 1/2013 |
| WO | 2008/091218 | 7/2008 |
| WO | 2011/142718 | 11/2011 |
| WO | 2012/109691 | 8/2012 |
| WO | 2013/056710 | 4/2013 |

* cited by examiner

METHOD FOR MEASURING CATALYTIC REACTIVITY IN DIAGNOSING A GAS-PERMEABLE OBJECT, AND APPARATUS THEREFOR

CROSS-REFERENCE TO RELATED APPLICATIONS

The present application is a U.S. National Stage of International Patent Application No. PCT/EP2014/077048 filed Dec. 9, 2014, and claims priority of Europe Patent Application No. 13196688.9 filed Dec. 11, 2013, the disclosures of which are expressly incorporated by reference herein in their entireties.

BACKGROUND OF THE INVENTION

1. Field of the Invention

The invention relates to a method for diagnosing a gas-permeable object, such as a catalyst or a filter, that was removed from an exhaust gas tract connected downstream of an internal combustion engine, in particular removed from a motor vehicle.

Furthermore, the invention relates to an apparatus for diagnosing a gas-permeable object, such as a catalyst or a filter, that was removed from an exhaust gas tract connected downstream of an internal combustion engine, in particular removed from a motor vehicle.

2. Discussion of Background Information

From the prior art, methods and apparatuses for diagnosing in particular gas-permeable objects such as catalysts and filters have become known, which objects are removed from a system, in particular a motor vehicle, for a cleaning or reconditioning. Such catalysts and filters can also be used on ships, locomotives and the like for the aftertreatment of exhaust gas. Normally, internal combustion motors such as diesel motors are thereby used as internal combustion engines. In methods known from the prior art, a physical function of gas-permeable catalysts constructed as wall-flow filters is measured in that, for example, a counter pressure or a weight of the catalyst is measured in order to obtain information about a fouling of the catalyst. However, the data determined thereby is not sufficient to allow a function of the catalyst in the vehicle after re-installation to be assessed. In particular, methods from the prior art cannot be used to determine whether relevant exhaust gas standards can be met by the catalyst after re-installation in a vehicle.

SUMMARY OF THE EMBODIMENTS

Embodiments of the invention specify a method of the type named at the outset with which particularly accurate information about a function of an object of this type can be obtained.

Furthermore, an apparatus of the type named at the outset is to be specified with which a function of said object can be determined in a particularly accurate manner.

According to the invention, a method of the type named at the outset for measuring a catalytic reactivity, in which a test medium with a defined composition, such as propane gas or carbon monoxide, is applied to a front face of the object through an opening by means of a device, wherein at a position located downstream a concentration of at least one reduced or oxidized constituent of the test medium is measured after passage through the object and/or a temperature of the object is measured after the test medium is applied thereto.

As part of the invention, it was found that the catalytic reactivity can be measured by applying a test medium to the object and by measuring whether a chemical reaction such as a reduction or an oxidation of constituents of the test medium takes place in the object.

The measurement to determine whether a chemical reaction takes place in the object can thereby occur, according to a first embodiment of the invention, solely by measuring a concentration of at least one reduced or oxidized constituent of the test medium at a position located downstream after passage through the object. A temperature measurement is thereby not necessarily required.

Alternatively or additionally, according to a second embodiment of the invention, it can be provided that the measurement to determine whether a chemical reaction takes place in the object occurs by measuring the temperature of the object after the test medium is applied, typically using a thermal probe. Generally, a wide range of different devices known from the prior art can be used to measure temperature, for example, a thermal imaging camera or an imaging camera with color zone detection, which displays a red coloration as a result of a glowing surface following the start of the reaction. Since heat is emitted during a chemical reaction such as a catalytic reaction in a catalyst, the measuring of a temperature or a temperature change of an object after the test medium is applied thereto can be used to easily determine whether a chemical reaction takes place in the object, and thus whether a catalytic reactivity is present. The measurement of the temperature can occur at a surface of the object in order to determine a catalytic reactivity of a boundary zone. In addition, the measurement of the temperature can also take place at a depth of a filter cell in order to determine a catalytic reactivity in a core zone. An analysis of the test medium after passage through the object is thereby not necessarily required.

A catalytic reactivity of the normally gas-permeable catalyst or a gas-permeable filter having a catalytic coating can thus be measured, and information about the exhaust gas standards that can be met by the catalyst can be obtained. The method can, for example, be used for diagnosing a coated or uncoated wall-flow filter. This method can be automated and performed at low cost. Furthermore, if this method is used following a reconditioning, the risk of catalysts with an insufficient catalytic reactivity being re-installed in a vehicle is avoided. The catalytic reactivity is an indicator of how well pollutants are converted in the catalyst. A method according to the invention renders it possible to determine an aging behavior of a catalyst and a quality of a catalytic coating in new condition. For example, information about a platinum content of the coating can thereby also be obtained. Of course, the method can be performed at either of the two front faces of the catalyst. An appropriate test medium can also be applied to both front faces simultaneously. Typically carbon monoxide, propane gas, nitric oxide, an aerosol or a test liquid is used as a test medium. Preferably, a test gas is used.

It is advantageous if the object is, at least in one section, brought to a defined temperature before the test medium is applied. In this manner, the catalytic reactivity of the object can be measured at different temperatures, and a light-off curve and a 50% light-off point can be determined. For example, the object can be brought to the desired temperature by applying a test medium at a corresponding temperature. In a particularly simple embodiment, it can also be provided that only one section of a front face of the object to which the test medium is applied is brought to a desired temperature, for example, using a burner with a gas flame. Typically, a between 200° C. and 300° C. is chosen thereby. Multiple measurements at differing temperatures can also be conducted, wherein the temperature to which the object is brought is increased incrementally.

A flammable test medium can also be used in order to bring or heat up the object to a desired temperature by means of burning before the measurement is conducted. During the heating, a temperature of the object or of a section of the object is thereby measured, and the burning of the test medium is ended once the desired temperature has been reached, for example, by shutting off a gas supply. The test medium is subsequently introduced into the heated section of the object and the temperature of the section continues to be measured. From a subsequent increase in the temperature of the section, it is possible to deduce a chemical reaction of the test medium in the object, or what is referred to as a lighting of the catalyst. Normally, these method steps are performed at different temperatures of the object in order to determine a starting temperature at which a lighting of the catalyst occurs, or what is referred to as a light-off temperature. A temperature at which the catalyst or a section of the catalyst is still just able to light constitutes a light-off temperature of the respective section or of a measuring point. The catalytic reactivity can be described in terms of the light-off temperature, wherein a lower light-off temperature indicates a higher catalytic reactivity.

To be able to determine a lighting in a particularly accurate manner, it is advantageous if, before and after the test medium is applied to the object, a surface temperature of the object or of a section of the object is measured, specifically at the front face. Normally, the temperature is also measured during the application of the test medium. The front face can thereby be understood as meaning a surface through which a gas can flow into or out of the object. Accordingly, the two front faces of a filter or catalyst are often also referred to as the inflow side and outflow side.

To determine the catalytic reactivity of individual sections of the object, it is advantageous if the temperature of a section of the object is measured after the test medium is applied thereto, in particular using a radiation thermometer. Thus, individual sections of a catalyst or individual sections of a surface such as a front face can have different light-off temperatures and thus different catalytic reactivities. Typically, individual sections of the object can be measured sequentially with the described method, so that the catalytic reactivity of each section is available as a result.

A radiation thermometer has proven effective for determining temperatures of individual sections in a non-contact manner with particular precision. Of course, the temperature measurement can also occur by means of other methods known from the prior art or with other apparatuses known from the prior art.

Furthermore, the temperature of the object can also be indirectly measured via a temperature of a medium that contacts or has contacted the object, for example, by measuring the temperature of the test medium after passage through the object.

To determine the light-off temperature, it has proven effective that the measurement of the catalytic reactivity is performed multiple times, wherein a temperature of the object, at least in one section, is increased incrementally between measurements, in particular by means of a gas flame or a hot gas flow. Normally, a section of the front face is brought to different temperatures in order to determine the light-off temperature.

Typically, the preferably chemically reactive test medium is supplied at different temperatures in order to determine a catalytic reactivity of the object at different temperatures. In this manner, a light-off curve and a 50% light-off point can be determined. The temperature at which 50% of the pollutants are converted in the catalyst is referred to as the 50% light-off point. Normally, this point is roughly 240° C. on new catalysts for diesel-powered motor vehicles. In the case of used catalysts, this point shifts towards higher temperatures. By means of a measurement of the conversion rate via the temperature, what is referred to as a light-off curve can be determined, from which the 50% light-off point characteristic of a catalytic function or reactivity of the catalyst is derived. This 50% light-off point can then, for example, be used as a quality criterion for assessing and classifying reconditioned catalysts. A shift of the 50% light-off point towards lower temperatures is thus an indicator of an improvement in the catalytic reactivity or the conversion rate of the catalyst. Furthermore, changes such as a shift of the light-off curve towards higher temperatures or a flattening of the light-off curve towards a lower conversion rate can thus be identified. Additionally, a spatial velocity that is optimal for a maximum conversion rate, that is, a ratio of a volume flow rate to a volume of the catalyst, can thus be determined.

Preferably, the measurement is conducted in a temperature range of 10° C. to 600° C., in particular 200° C. to 300° C., and at a volume flow rate between 0 $dm^3/m$ and 33000 $dm^3/m$. This value is based on a full flow. In a partial flow, a volume flow rate of 0 $dm^3/min$ to 3000 $dm^3/min$ has proven advantageous. A mass flow rate is advantageously approximately 0 kg/h to 2000 kg/h in a full flow. Typically, catalysts with a diameter of approximately 30 cm are used. A flow velocity of the test medium during the measurement of more than 0 m/s to approximately 50 m/s has proven particularly effective for obtaining conclusive measuring results. An optimal spatial velocity is 10000 1/h to 120000 1/h.

A measurement of the catalytic reactivity normally takes place in that process air is heated to approximately 400° C., after which the object is heated to approximately 300° C. with the process air. The test medium, in particular a test gas, is then heated and admixed with the process air, wherein a resulting gas mixture has a temperature of approximately 300° C. before the catalyst. During the measurement, a hydrocarbon concentration is measured after and possibly also before the catalyst in a direction of flow, a temperature is measured before and after the catalyst in a direction of flow, a pressure loss over the catalyst is measured, and an amount of particles is measured. At the same time, an amount of the test medium is incrementally or continuously increased, for example from 0 $dm^3/min$ to 2000 $dm^3/min$ in a partial flow, or from 0 $dm^3/min$ to 50000 $dm^3/min$ in a full flow. Normally, a device is used with which the test medium can be introduced into different sections of the catalyst in a targeted manner, so that the catalytic reactivity can be determined for individual sections. Once the measurement has been performed for all sections of the catalyst, the temperature is increased incrementally and the measurement is conducted again in order to obtain an additional measuring point at a higher temperature. This is repeated until the catalyst has been measured for a desired temperature range.

It is advantageous that a cleaning of the object occurs before, after or during a measurement of the catalytic reactivity, in particular using a device embodied as an integrated diagnostic and cleaning device. In addition to measuring a quality of the catalyst, the catalytic reactivity, the apparatus can thus also be used to clean the catalyst, as a result of which a particularly efficient method is achieved. An integrated diagnostic and cleaning device renders it possible to both measure a quality of the catalyst and also perform a cleaning based on the measured quality, so that a particularly efficient method is achieved. For this purpose, a cleaning is typically performed by means of a medium transported through an opening of the device, wherein a quality is also measured using a medium transported through the same opening or using radiation transported through the opening. Furthermore, a quality test can be performed by measuring a number or a mass of particles transported through the filter and by measuring a volume flow rate or mass flow rate at which a maximum conversion rate is achieved at a defined temperature.

It is advantageous that a cleaning takes place by means of a preferably gaseous medium that is in particular also applied to the object through the opening. A diagnostic analysis and a cleaning of the same region of the catalyst can thus occur without moving the catalyst or the diagnostic and cleaning device. In this manner, it is ensured that exactly the same section is cleaned and diagnosed without having to move the device, which can lead to errors. Furthermore, this enables a particularly rapid changeover from a diagnostic process to a cleaning process, as a result of which a cleaning process controlled by a quality as a control variable can be performed in a highly efficient manner. The advantage of a purely gaseous cleaning medium is that damage to the catalyst is avoided, which damage typically occurs during a cleaning with liquids or with fluids that contain solids. Alternatively, a cleaning with a liquid medium or a solid medium in dry form, such as a powder, is also possible.

It can also be provided that, as a cleaning medium, aerosols comprising at least one gas and one or more liquids, dry or wet steam, liquids such as alkali- or acid-based aqueous solutions, or concentrated solvents such as sulfuric acid, sodium hydroxide solution or the like can be used. Multiple cleaning media can also be used at the same time. Advantageously, the cleaning medium can be applied to the object through a nozzle, through which compressed air can also be applied.

It is advantageously provided that a cleaning takes place by means of compressed air that is applied to the object at a pressure of less than 50 bar, in particular 1 bar to 10 bar. Channels of a wall-flow filter can thus be cleaned in a particularly effective manner. The compressed air is usually applied to small sections or individual channels of the catalyst at room temperature. It has thereby proven effective that the compressed air exits through a nozzle at a high velocity, as a result of which the compressed air strikes the catalyst with a high momentum. Damage to the catalyst due to pressure applied over a wide area is thus avoided. In particular, it can be expedient if a gas or an aerosol is applied to the catalyst at a high velocity and with a high momentum, in order to achieve a suitable cleaning effect. If a de Laval nozzle is used as a nozzle, the air can also be applied at supersonic velocity in order to achieve a particularly suitable cleaning effect. It has proven advantageous that the compressed air is not applied at a constant pressure, but rather with a pulsed alternating pressure, preferably at a pulse frequency of 0.5 Hz to 200 Hz, particularly 1 Hz to 100 Hz. To achieve a particularly suitable cleaning effect, it can thereby be provided that, with each pulse, a pressure surge is applied to the air, which surge accelerates the air to a supersonic velocity similar to the case of a pulsejet engine.

Aerosols and other cleaning media, such as dry and wet steam, alkali- or acid-based aqueous solutions, and concentrated solvents, can also be applied through the nozzle in addition to compressed air.

Preferably, a cleaning of the object occurs using a hot medium, in particular a hot gas. This enables an efficient burning-off of soot located in the catalyst. The hot medium, in particular a gas, normally air, is thereby introduced into the catalyst at a temperature of 100° C. to 900° C., typically 200° C. to 700° C. In addition to a feed line for the hot gas, the device preferably also comprises a feed line for a cold gas such as compressed air, so that the catalyst can be quickly cooled down by an application of cold compressed air after a cleaning by means of the hot gas. An especially rapid changeover from a thermal cleaning process to, for example, a mechanical cleaning process is thus possible.

It can also be provided that another type of a quality of the object is measured before, after or during a measurement. If another type of quality aside from the catalytic reactivity is determined using the method, particularly precise information about the function of the catalyst in the vehicle can be obtained, for example, how high a pressure loss over the catalyst is in an exhaust gas tract. It is advantageous if the other measured types of quality are also measured using the same device with which the catalytic reactivity is measured, in particular with a device embodied as an integrated diagnostic and cleaning device. The quality can also be measured by measuring a weight of the catalyst or by measuring a weight change during the cleaning.

The weight of the object can also be measured continuously during a cleaning with a cleaning medium such as compressed air or a hot gas. Because an additional force resulting from the pressure at which the cleaning medium is applied to the object would distort the measurement result, it is advantageous if a measuring signal of a scale or the like is prepared statistically over time and is in particular smoothed so that the measured value can be easily corrected for this additional force. An uninterrupted closed-loop process is thus possible, wherein the cleaning result is determined simultaneously with the cleaning.

In addition, a quality measurement can also take place by means of electromagnetic radiation, neutron radiation or microtomography. A measurement by means of a neutron radiation has proven particularly advantageous, since ash can be identified extremely well due to an especially strong contrast. A natural frequency of a substrate or a vibration damping of the substrate can also be measured and used to assess the quality, in particular an ash loading.

It is expedient that the measurement of the quality occurs by means of a medium or an electromagnetic radiation that enters or exits through the opening. The other type of quality can thus be measured for the section for which the catalytic reactivity is determined. For this purpose, for example, a camera can be arranged in the device such that a catalyst located in front of the opening can be optically measured using said camera. A fouling of individual channels can thus be measured in a particularly accurate manner, so that a cleaning can be calibrated thereto, for example.

For measuring a fouling of the object or a flow resistance of the object caused by a fouling, it has proven advantageous that a preferably gaseous medium is applied to the object through the opening at a defined pressure or a defined volume flow rate, and that a counter pressure and/or a pressure loss and/or a change in the volume flow rate over the catalyst is measured. The measurement of the object can, for example, take place via a pressure sensor arranged in the apparatus. Alternatively or additionally, a sensor with which a flow can be measured can also be provided in order to thus infer a counter pressure of the catalyst. The counter pressure can be measured during the application of the test medium to the catalyst or in a separate diagnostic step in which a gas, preferably air, is applied to the front face of the catalyst at a defined pressure. Furthermore, it is advantageously provided that a temperature sensor and/or a hydrocarbon sensor and/or a flow sensor and/or a dynamic pressure sensor and/or a sensor for measuring a static pressure are provided in the housing in order to acquire in a particularly accurate manner relevant data for a medium applied to the catalyst through the opening. The device can then be used to successively perform a cleaning and a testing of the catalyst by means of an alternating application of a cleaning medium and test medium through the opening.

Typically, a reconditioning of a catalyst occurs in a successive manner by a cleaning of the catalyst lasting several minutes, which is followed by a phase lasting only a few minutes or seconds during which a quality of the catalyst is measured. These two phases are repeated in an alternating manner until a termination criterion is reached, for example, once no further quality improvement can be achieved. For this purpose, a cleaning is usually performed at a pressure of 1 bar to 10 bar, from which an air flow with a high velocity is generated via a nozzle, for approximately four minutes, after which a pressure loss over the catalyst is measured by sections or in one section or in a full flow at a volume flow rate with low pressure, wherein the pressure and the volume flow rate roughly correspond to an exhaust gas flow of an internal combustion engine. This pressure loss is, for example, measured for approximately two minutes, wherein a measured pressure loss can typically be approximately 0.001 bar to 0.5 bar.

Expediently, a structural condition of the object is measured. On the one hand, this can be performed with a camera or a 3D geometry capture system. On the other hand, a structural condition of the catalyst can be also be determined by a sensing of the catalyst using a laser scanner, a mechanical sensor or an electrical contact sensor, wherein a contour is determined and possibly compared with a target contour. In addition, a structural condition can be measured in that a defined force is applied to regions of the catalyst using the device and a deformation, such as a sag or a shift, is measured. In this manner, a stability of a fit of a substrate compressed in a canning using a mounting mat can also be measured. Furthermore, a structural condition and a retention action of the mounting mat can be determined using a hysteresis curve between a load curve and relief curve. A loading force is thereby advantageously measured via a sensor at a force-introduction position, for example, by means of a flow measurement, a torque measurement in the case of a spindle that drives the device, a strain gage or the like. A reaction force is normally also measured via a sensor such as a scale or a strain gage. To determine the retention force or the retention action of the mounting mat, a hysteresis of the reaction force in relation to the load force can be used.

Preferably, the device is moved to different positions of the object by a multiaxial drive in order to measure and/or clean individual sections. A particularly flexible method is possible if the device can be moved translationally in three directions and rotationally in three directions, for example, by means of a Cartesian robot. It can also be provided that positions or movements of the device are stored, so that it is possible to move to positions repeatedly, for example, to diagnose said positions in a targeted manner after a cleaning. It is thus possible to measure a quality and perform a cleaning at any position of the catalyst, which is normally arranged on a light-permeable and gas-permeable base in the apparatus. Normally, the device can be moved in a force-controlled manner with the drive, so that while a force necessary for a movement is measured, a sensing and a measurement of a structural condition can also be easily performed with the device.

According to the invention, an apparatus of the type named at the outset, includes a device with a housing comprising an opening and a control device are provided for measuring catalytic reactivity, wherein a test medium with a defined composition can be transported through the opening by the control device, wherein furthermore a sensor for measuring at least one concentration of a reduced or oxidized constituent of the test medium and/or a thermal probe with which a temperature of a surface of the object can be measured is provided.

Propane gas, carbon monoxide or nitric oxide, an aerosol, or a test liquid can be used as a test medium. A measurement of the catalytic reactivity is thus possible in a simple manner. The control device normally comprises a compressor with which the test gas can be transported through the opening at a defined pressure and/or at a defined volume flow rate. In order to supply the preferably chemically reactive test gas to the device, a test gas storage means such as a propane gas tank and a test gas line are normally connected to the device. Typically it is also possible to use the control device to alter a temperature of the test gas, in order to simulate different operating states of a vehicle. One or more sensors for measuring gases converted or reduced or oxidized in the object, such as hydrocarbons or nitrogen dioxide, are preferably positioned at a front face of the catalyst, opposite of the front face at which the test gas is introduced into the catalyst. However, these sensors can also be arranged at an alternative position if a gas that has passed through the catalyst flows around or through said alternative position. Instead of a direct measurement of converted constituents, unconverted constituents of the gas can of course also be measured, in order to infer a catalytic reactivity of the catalyst by taking the composition of the test gas into account. In this case, converted constituents are determined indirectly.

A particularly accurate analysis of the catalyst with regard to achievable exhaust gas limits during use in a vehicle is possible if a test gas is used which corresponds to an exhaust gas of a diesel engine. In this manner, a use in a vehicle is simulated. Typically, an exhaust gas flow amount with a temperature and a velocity similar to those found in a diesel engine are used for a test of the function of the object. Preferably, a test of this type with an exhaust gas similar to that of a diesel engine is performed by sections, wherein the test gas is only applied to one section of the object. In this manner, the air exchange rates of approximately 50000 l/h, which are functionally relevant for an object such as a filter or catalyst, can be achieved in the respective section or in an entire cross-section during the test.

Furthermore, a hydrocarbon sensor can also be provided in order to determine residues of fuel or motor oil present. This has proven effective for adapting a cleaning strategy that, without modifications, could not be used for a catalyst fouled with motor oil, for example a thermal cleaning. Additionally, damage to a vehicle in which the catalyst was installed can also be deduced based on the residues found.

To measure the catalytic reactivity according to a first embodiment, a sensor for measuring at least one concentration of a reduced or oxidized constituent of the test medium can be provided. If the catalytic reactivity is only measured via a concentration of a reduced or oxidized constituent of the test medium after passage through the object, a thermal probe is not necessarily required.

Alternatively or additionally, a thermal probe for measuring a temperature of a surface of the object can be provided in order to infer from a temperature change a chemical reaction taking place in the object, and thus a catalytic reactivity. If the catalytic reactivity is only measured via a temperature change or a temperature of the object, a sensor for measuring a concentration of a reduced or oxidized constituent is not necessarily required.

To determine a light-off temperature of the object or the catalytic reactivity of individual sections of the object, it is advantageous if the apparatus is embodied such that at least one section of the object can be brought to a defined temperature, in particular by means of a gas flame or a hot gas flow such as a hot air flow. A thermal probe is normally provided to determine the temperature of the object. The object is then advantageously heated by the gas flame while the temperature is measured until a desired or defined temperature is achieved.

A measurement of the catalytic reactivity of the object by means of a temperature measurement can take place in a particularly accurate manner if a thermal probe that is embodied as as a radiation thermometer is provided. Temperature distributions on a surface of the object can thus also be easily measured in order to determine a light-off temperature for individual sections of the object.

To perform a cleaning of the object in a simple manner and as a direct function of a measured catalytic reactivity, the device is preferably embodied as an integrated diagnostic and cleaning device. Preferably, a measurement of the quality and a cleaning occur using the same nozzle or through the same opening, so that a repositioning of the device between diagnostics and cleaning is not necessary.

It can also be provided that the apparatus, in particular the device, is embodied with a compressed air feed line and a compressed air valve for cleaning the object with a pressurized medium or an air flow with a high velocity, particularly compressed air. Typically, the test gas line and a compressed air line embodied to supply compressed air end in a common housing of the device, from where the compressed air and the test gas can exit out of the device through the opening so that the respective gas is applied to the catalyst. The test gas can thereby also be applied during a cleaning of the catalyst by means of compressed air or by a negative pressure. It is thus simultaneously possible to measure a quality of the catalyst or diagnose the catalyst and to perform a cleaning.

Advantageously, the apparatus, particularly the device, is embodied for thermally cleaning the object. For this purpose, it is normally possible to apply a hot gas to an object positioned in front of the opening by means of the apparatus, in particular the device. This enables a cleaning burn-off of soot located in the catalyst typically embodied as a wall-flow filter. The thermal cleaning can also occur by introducing heat into the catalyst by means of thermal radiation or induction. However, it is advantageous if a hot gas is applied to the catalyst at a temperature of 100° C. to 900° C. For this purpose, a hot gas line is typically connected to the device and a corresponding valve or a hot gas regulating device is provided. By means of the hot gas line, the hot gas can be supplied to the housing, from where it can preferably be applied to the catalyst through the opening. A thermal cleaning and a regeneration of the filter can also occur with the use of the oxygen from a compressed air line. An oxygen supply can thus be easily controlled so that the regeneration can proceed in a regulated manner. With a diagnostic and cleaning device of this type, a simultaneous or alternating measurement of the catalytic reactivity and thermal cleaning of the catalyst are possible. A thermal cleaning can thus, for example, be performed while measuring the catalytic reactivity until the catalytic reactivity cannot be improved any further despite continued cleaning. To control the thermal cleaning, a control is advantageously also provided to regulate the temperature and volume flow rate of the hot gas.

It can also be provided that the apparatus, in particular the device, comprises a pressure sensor with which a counter pressure and/or a pressure loss can be measured. Aside from a measurement of the catalytic reactivity, which characterizes a chemical function of the catalyst, this allows a measurement of a counter pressure of the catalyst, which indicates a physical function or a clogging of the catalyst with fouling. With increasing fouling of the catalyst, a counter pressure or a pressure loss over the catalyst increases for a constant volume flow rate and constant temperature, which means that a lower pressure loss corresponds to a higher cleaning level of the catalyst, which is typically embodied as a wall-flow filter provided with a catalytic coating. Alternatively or additionally, a volume flow rate sensor, a mass flow rate sensor and/or a lambda sensor can be provided. The respective sensors can thereby be arranged in the device, preferably in the normally tube-shaped housing, and/or after the catalyst in a direction of flow, in order to also measure a pressure of the gas exiting the catalyst. To measure the pressure loss, a gas flow can be applied to the catalyst, which flow creates a counter pressure of 0.001 bar to 1 bar when flowing through the catalyst. As an alternative or addition to a pressure sensor, a flow sensor can also be provided in order to determine a flow resistance.

Preferably, the apparatus, in particular the device, comprises a camera or a laser scanner to optically measure a structural condition of the object. Typically, a structural condition of the catalyst can be optically measured by the camera through the opening. This enables a simple optical detection of a section of the catalyst in which the catalytic reactivity is measured. For example, it can thus be determined that considerable structural damage is present on the catalyst, as a consequence of which a cleaning must be aborted. In this manner, unnecessary costs can be avoided. For focusing the camera, it is advantageous if the camera or a movably arranged lens of the camera can be displaced in a longitudinal direction of the housing, so that the camera or lens can also be moved out of the housing through the opening. For this purpose, the camera or the movable lens of the camera is typically embodied with a smaller diameter than the opening.

The device is normally arranged in a multiaxially movable, in particular force-controlled, manner for variable positioning in the apparatus. This allows a particularly flexible positioning and a measurement of the quality of the catalyst at various positions. Normally, the opening has a smaller cross-section than the catalyst, which typically has a diameter of 100 mm to 400 mm, in particular approximately 300 mm, and a length of 50 mm to 500 mm, in particular approximately 250 mm. To diagnose and clean individual sections of the catalyst in a particularly precise manner, it is advantageous if the opening has a diameter of less than 20% of the diameter of the catalyst, normally less than 10%. Preferably, a diameter of the opening is less than 20 mm, typically 2 mm to 10 mm. Advantageously, the opening is embodied as a contact surface for the catalyst and has a cross section of less than 50% of a front face of the catalyst. Advantageously, the opening is embodied in such a way that, with a minimal number of adjacent measuring surfaces to which the device is moved in succession, a most complete possible measurement of the front face is possible. In this context, a contact surface in the form of a roughly isosceles triangle has proven effective, wherein one side of the triangle is embodied as a circular arc, so that the contact surface is roughly equal to one sixth of the front face. The device therefore must only be moved to six positions in order to fully clean the catalyst.

A particularly high measuring accuracy is achieved if a measuring bell that protrudes preferably at least 1 mm past the opening is connected to the housing. Typically, the measuring bell, which is normally arranged concentrically with the housing and the nozzle, comprises a circumferential seal preferably composed of an elastomer, which ensures that a gas exiting the opening penetrates channels of the catalyst. A test medium or cleaning medium transported through the device essentially exits at the nozzle. However, the measuring bell is connected to the housing by purge air openings to prevent differing gas compositions in the measuring bell and in the housing.

In a measurement of the catalytic reactivity, the seal of the measuring bell is pressed onto the surface that is to be analyzed, normally a front face of a catalyst, preferably with a force of 20 N to 70 N. The force normally depends on a size of the measuring surface, an inner pressure and a seal load. A force of 1 $N/cm^2$ to 100 $N/cm^2$ with an inner pressure of approximately 5 $N/cm^2$ has proven advantageous. Each of the indicated forces is based on a lateral surface or contact surface of the measuring bell with the front face of the catalyst. Alternatively, the measuring bell can also be spaced apart from the catalyst surface, in order to apply the test gas to the entire surface.

During a cleaning, the measuring bell is normally lifted off of the catalyst, so that air flowing out of the nozzle can flow without static pressure, but with a high momentum, onto the surface and into the channels ending at the front face of the catalyst. By means of a movement of the housing over the catalyst, all channels can be cleaned in sequential steps and one or more types of quality can be determined for all channels. Depending on the catalyst, in particular a structural condition, a counter pressure, a flow resistance, a physical function and a chemical function such as a catalytic reactivity can be viewed as types of quality.

For a thermal cleaning by means of a hot gas, the measuring bell preferably bears tightly against the surface, so that the hot gas can be introduced into the catalyst or into individual sections of the catalyst with a low counter pressure.

A quality of the object can thereby also be determined during the cleaning with a hot gas or the like with a tightly fitted measuring bell in that a counter pressure of the object is measured and a volume flow rate of the hot gas is increased until a counter pressure of 0.001 bar to 1 bar is reached. With an increasing cleaning level, a higher volume flow rate is required to achieve a corresponding counter pressure, as a result of which the quality can be determined by the volume flow rate.

The measuring bell can also be embodied with a force sensor and/or a motion sensor in order to measure a geometry of the catalyst. For this purpose, the measuring bell can also be movably connected to the housing. For a measurement, the measuring bell is then pressed onto the catalyst with a defined force and a deformation is measured. As a result, it is thus possible to determine, among other things, a height and a position of the catalyst on the base in a particularly simple manner.

Preferably, the device is arranged in a closed stationary housing, wherein a flexible membrane connected in a sealing manner respectively to the device and the stationary housing is provided to hermetically separate regions in the stationary housing. This prevents, in a simple manner, a contamination of a surrounding environment with contaminants released from the catalyst or with test or cleaning media. If the device is embodied in a movable manner in a closed stationary housing, it is advantageous if a flexible sealing element, in particular a membrane or field membrane, is connected to a movable part of the device and the housing in such a fixed and tight manner that a region or a space in which the catalyst is positioned for a measurement is hermetically separated from a space in which a drive of the device and/or mechanics for moving the device are arranged. Damage to the drive or the mechanics by contaminants or by test or cleaning media is thus prevented in a simple manner. At the same time, the flexible field membrane ensures a leak-tightness despite a relative movement of the device with respect to the apparatus. As an alternative to a field membrane or additionally, a steep pressure gradient can be provided between a work space in which the catalyst is cleaned and a surrounding environment, which gradient can for example be achieved by a powerful exhaust fan.

BRIEF DESCRIPTION OF THE DRAWINGS

Additional features, benefits and effects of the invention follow from the exemplary embodiment described below. The drawings which are thereby referenced show the following.

DETAILED DESCRIPTION OF THE EMBODIMENTS

Figure 1:
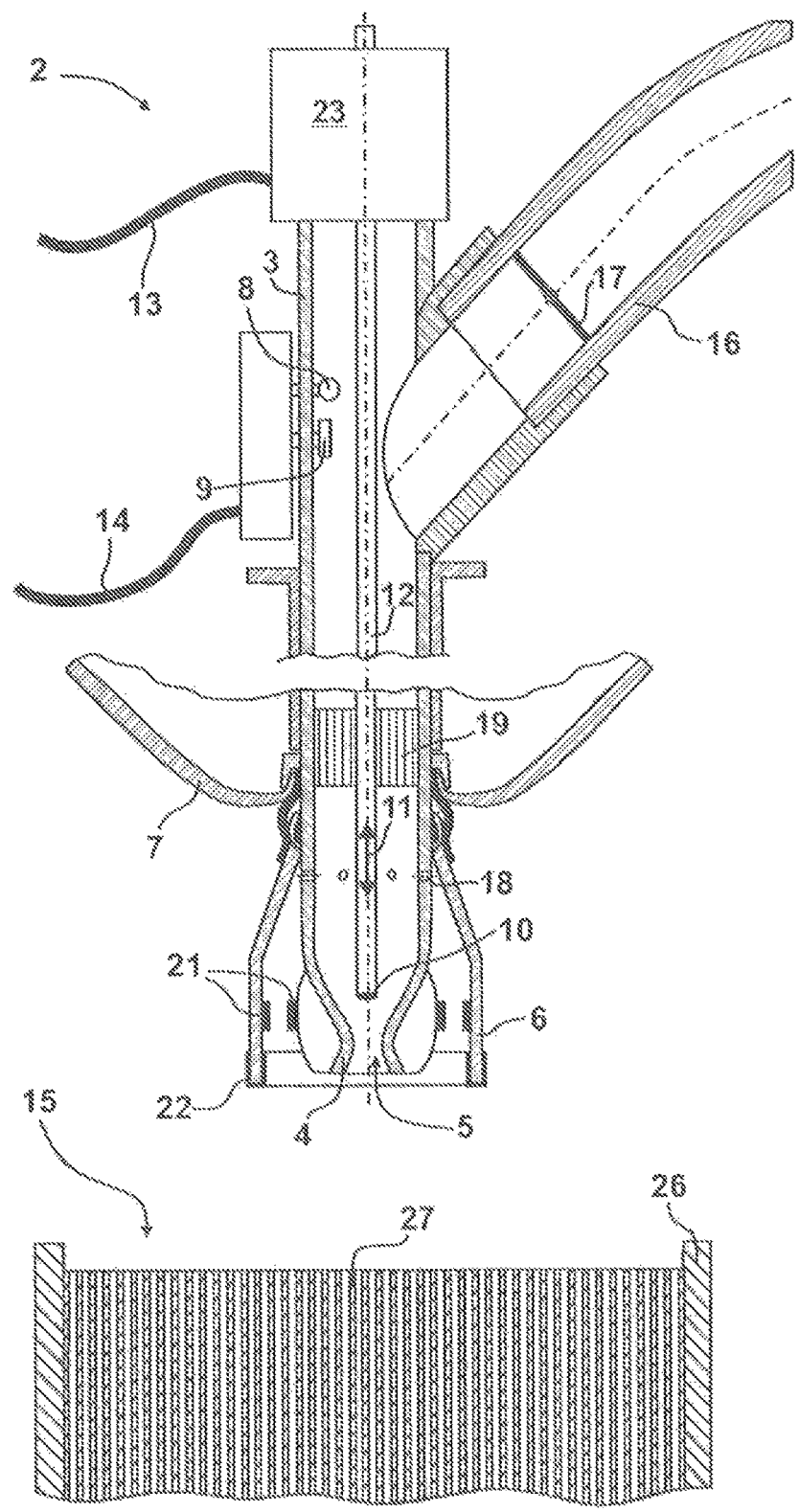
FIG. 1 A device for an apparatus according to the invention with a part of a catalyst in a sectional illustration.

FIG. 1 shows schematically a device 2 for an apparatus 1 according to the invention for diagnosing an object such as a catalyst 15 or a filter, in particular a particle filter, and a part of a catalyst 15 embodied as a wall-flow filter. The device 2 comprises a housing 3, to which a feed line 16 is connected in order to supply a test medium or cleaning medium. To measure a catalytic reactivity of the catalyst 15, a test medium, preferably a test gas such as carbon monoxide or propane gas, is supplied to the device 2 through the feed line 16. To regulate, in particular automatically, an amount and a temperature of the supplied test gas, a control device which is not illustrated is provided that is connected to sensors of the apparatus 1 and to a process control system. The illustrated device 2 comprises in the feed line a valve 17 or a throttle flap with which an amount of the supplied medium can be regulated. To apply the test medium to the catalyst 15, a nozzle 4 is provided at a bottom end of the housing 3, through which nozzle the medium typically exits at a pressure of up to 20 bar, preferably 0.5 bar to 10 bar, and a velocity of up to 330 m/s. If the nozzle 4 is embodied as a de Laval nozzle, a higher velocity in a supersonic range can also be reached. In the exemplary embodiment illustrated, an opening 5 of the nozzle 4 has a diameter of approximately 6 mm. The device 2 is provided for cleaning catalysts 15 removed from vehicles, which catalysts normally have a diameter of approximately 300 mm. With a correspondingly small cross-sectional area of the opening 5, it is therefore possible to test and clean in a targeted manner individual sections of the catalyst 15 or channels of a substrate 27 of the catalyst 15. Normally, the catalyst 15 is cleaned with the nozzle 4 while the catalyst is diagnosed with the measuring bell 6. For this purpose, a hot gas is normally applied to the catalyst 15 via the measuring bell 6 while a cleaning medium such as compressed air is applied at a high pressure through the nozzle 4.

A cleaning medium, for example compressed air, dry steam or a hot gas, is used for the cleaning. This cleaning medium also exits through the opening 5 of the nozzle 4 after flowing through the housing 3, so that a test medium and a cleaning medium can be applied using the same nozzle 4. If the measuring bell 6 comprises a separate feed line 16 and/or a line switch is provided in order to be able to choose between an outflow of the cleaning medium through the nozzle 4 and an outflow of the cleaning medium through the measuring bell 6, a test medium or a cleaning medium can also be applied solely through the measuring bell 6. It can also be provided that the device 2 comprises multiple feed lines 16, wherein a hot gas line and a compressed air line can be provided separately, for example. In order to specifically introduce an angular momentum into a flow in the housing 3 or reduce an angular momentum, an angular momentum control 19 is provided. Furthermore, in a bottom region in the housing 3, a camera 10 or a lens of a camera 10 is provided with which an image of a catalyst 15 arranged below the opening 5 can be acquired through the opening 5. As illustrated, the catalyst 15 is positioned below the device 2 such that a front face of the catalyst 15, where channels end, is opposite the opening 5. In this manner, a catalyst 15 checked using the device 2 can be analyzed both with regard to a catalytic reactivity and also optically with the camera 10, wherein a structural condition of individual channels can be assessed.

As can be seen, the camera 10 is arranged coaxially and concentrically on an approximately cylindrical guide 12 in the preferably tube-shaped housing 3. The camera 10 can thus be displaced axially along a camera movement direction 11. The camera 10 can thus also be moved out of the housing 3 through the opening 5 in order to analyze, for example, individual cells or channels of the catalyst 15 in a particularly accurate manner. In addition, a displacement of the camera 10 can also be advantageous for the purpose of improving a focusing. An evaluation of the image acquired with the camera 10 can take place directly in an image analysis device 23 positioned in a top region. In this position, an image sensor in which a digital image is generated can also be arranged. For transmitting the image to a process control system and/or a documentation system, a data cable 13 is illustrated by way of example. Alternatively, the camera 10 can also be arranged outside the housing 3 or in a non-coaxial manner in the housing 3, so that the camera 10 is located next to the nozzle 4.

Because a diagnostic analysis and a cleaning can be performed on the catalyst 15 with the same nozzle 4, a particularly rapid changeover from a diagnostic process to a cleaning process is possible. A simultaneous cleaning and diagnostic analysis of a catalyst 15 is possible if, for example, the catalyst 15 is cleaned mechanically using compressed air, wherein at the same time a volume flow rate occurring based on the pressure or a pressure occurring based on a volume flow rate is measured. An increasing volume flow rate indicates an improvement in a cleaning level, since a counter pressure of the catalyst 15 decreases. To measure different properties of a test medium or cleaning medium flowing through the housing 3, sensors are provided in the housing 3. In FIG. 1, a temperature sensor 8 and a pressure sensor 9 are illustrated by way of example. Additionally, sensors for measuring a dynamic pressure, a gas composition, a volume flow rate or the like can also be provided. A measuring cable 14 for transmitting the measured data to a process control system or a master computer is illustrated.

In a bottom region of the housing 3, an elastically deformable measuring bell 6 is arranged concentrically with the housing 3 in a movable manner, which measuring bell has at a bottom end a diameter of approximately 50 mm and is positioned concentrically and coaxially with the nozzle 4. As can be seen, the measuring bell 6 protrudes past the nozzle 4 by preferably at least 1 mm and comprises at a bottom end a circumferential seal 22, by means of which a tight connection between the device 2 and the catalyst 15 is produced when the device 2 is positioned at a front face of a catalyst 15. It can thus be ensured that a medium flowing out of the nozzle 4 must pass through the catalyst 15, whereby a counter pressure or a pressure loss, for example, can be measured in an extremely accurate manner. Furthermore, a direct contact of the nozzle 4 with the substrate 27 is prevented, whereby damage to the substrate 27 and to the nozzle 4 can be avoided. It can be seen that multiple purge air openings 18 are provided which allow a gas exchange between the housing 3 and the measuring bell 6. Alternatively, the nozzle 4 can also be arranged outside the measuring bell 6 next to the measuring bell 6, for example, to clean a section of the catalyst 15 with compressed air by means of the nozzle 4 and at the same time to diagnose another section of the catalyst 15 using the measuring bell 6. A separate feed line 16 for the measuring bell 6 can thereby also be provided so that the measuring bell 6 is also hydraulically separated from the housing 3.

For a cleaning of the catalyst 15 by means of compressed air, the measuring bell 6 is preferably lifted a few millimeters off of the catalyst 15 so that the compressed air can flow onto the surface and into the channels only with a high momentum and not with any static pressure. A distance between the device 2 and the catalyst 15 also enables a relative movement between the device 2 and the catalyst 15, as typically occurs during a cleaning, in order to sequentially clean the individual sections or channels of the catalyst 15.

For a thermal cleaning, hot air, preferably at a temperature of 100° C. to 900° C., particularly 200° C. to 700° C., is conducted through the feed line 16, wherein the measuring bell 6 normally bears tightly against the catalyst surface with the seal 22. Hot air is thereby conducted with a low counter pressure through a part of the catalyst 15. Sensors arranged downstream of the catalyst 15 are then typically provided to measure a pressure, a temperature and possibly a degree of regeneration by means of a hydrocarbon sensor 28 or a carbon monoxide sensor.

A test medium or cleaning medium is advantageously cleaned after passage through the catalyst 15 in order to prevent a contamination of a surrounding environment. A hot test medium or cleaning medium is thereby normally cooled before it is cleaned.

To move the device 2 to different positions of the catalyst 15, a drive which is not illustrated is provided, preferably a Cartesian robot or a rotary articulated control element for moving the device in a polar coordinate system, with which drive the device 2 can be moved translationally in three directions and rotationally in three directions. The device 2 can thus be moved to any position of the catalyst 15 in order to clean or check it. Furthermore, by means of a movement of the device 2 along the catalyst 15, a geometry or a contour of the catalyst 15 can also be measured in a simple manner, wherein normally contact sensors or force-measuring sensors are provided. In the illustrated embodiment, the measuring bell 6 is connected to the housing 3 in such a movable manner that a lateral force on the measuring bell 6 results in a closing of the contact switch 21. Forces in a horizontal direction can thus also be measured, which forces are indicative of a side edge of the catalyst 15 or a canning 26 protruding past the substrate 27. A position of the catalyst 15 in the apparatus 1 can thus also be accurately measured.

To prevent a contamination of a top part of the stationary housing 20 in which the image analysis device 23 and normally the drive are positioned, a field membrane 7 is provided. The field membrane 7 is tightly connected to a movable part of the device 2 and to a sealed stationary housing 20 in which the device 2 is arranged. To accommodate relative movements between the device 2 and the stationary housing 20, the field membrane 7 is embodied in a flexible manner. A contamination of a surrounding environment by the contaminants released from the catalyst 15 and by test or cleaning media is thus prevented by the stationary housing 20. By means of the field membrane 7, a contamination of a top part of the stationary housing 20 by contaminants and media located in the lower part is prevented. A disposal of contaminants released from the catalyst 15 and of test and cleaning media occurs by means of a vacuum, which is connected to a bottom part of the stationary housing 20 in which the catalyst 15 is positioned for a diagnostic analysis and a cleaning.

Figure 2:
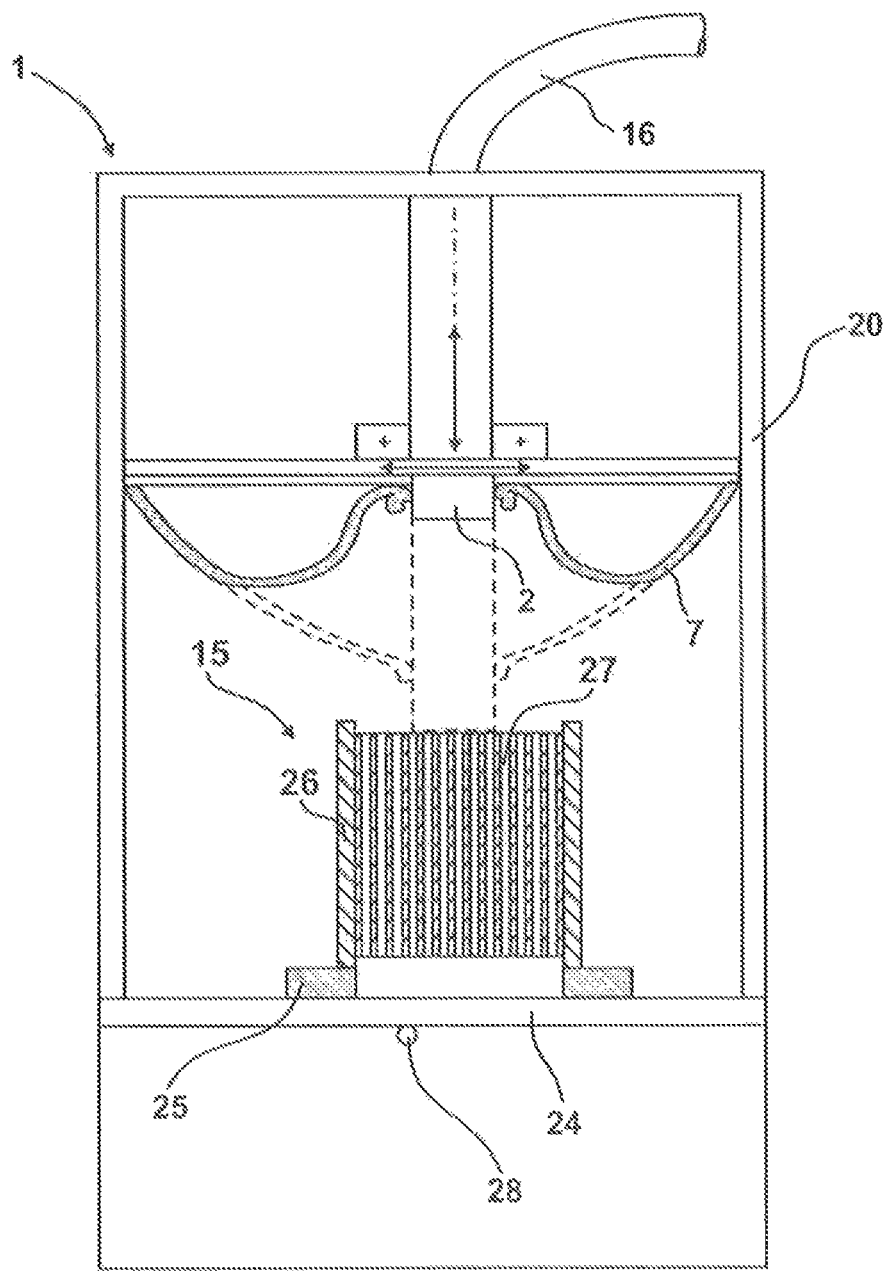
FIG. 2 An apparatus according to the invention.

FIG. 2 shows an apparatus 1 according to the invention embodied as a diagnostic and cleaning station, in which apparatus a catalyst 15 is arranged for a diagnostic analysis and a cleaning. Furthermore, in a stationary housing 20 of the apparatus 1, a device 2 as described above is arranged in a multiaxially movable manner. Two vertical positions of the device 2 are schematically illustrated. As can be seen, a sealing of a top part of the stationary housing 20 against a bottom part in which the catalyst 15 is arranged is ensured in each of the illustrated positions by the flexible field membrane 7.

The catalyst 15 is positioned on a preferably light-permeable and gas-permeable base 24 via a scale 25, so that the catalyst 15 can be optically analyzed and pressure, temperature and constituents of a medium that has passed through the catalyst 15 can be measured downstream of the catalyst 15. For this purpose, a hydrocarbon sensor 28 is illustrated by way of example with which a catalytic reactivity can be determined when a test medium with a known composition is introduced.

As shown, the catalyst 15 is positioned on the scale 25 such that the substrate 27 is only indirectly mounted on the scale 25 via the canning 26. This enables a simple check of a stability of a connection of the canning 26 to the substrate 27, in that a controlled pressure is approximately vertically applied to the substrate 27 from above and a displacement is measured. An insufficient stability of the connection between the substrate 27 and the canning 26 can be determined from a displacement of the substrate 27 relative to the canning 26 which is above a limit value at a defined force. Additionally, a reaction force measured in the scale 25 can also be used to assess the connection. With the scale 25, an axial loading of the catalyst 15 can also be measured by comparing a measured weight with a weight of a new catalyst 15, wherein a cleaning result can be determined during a cleaning.

Figure 3:
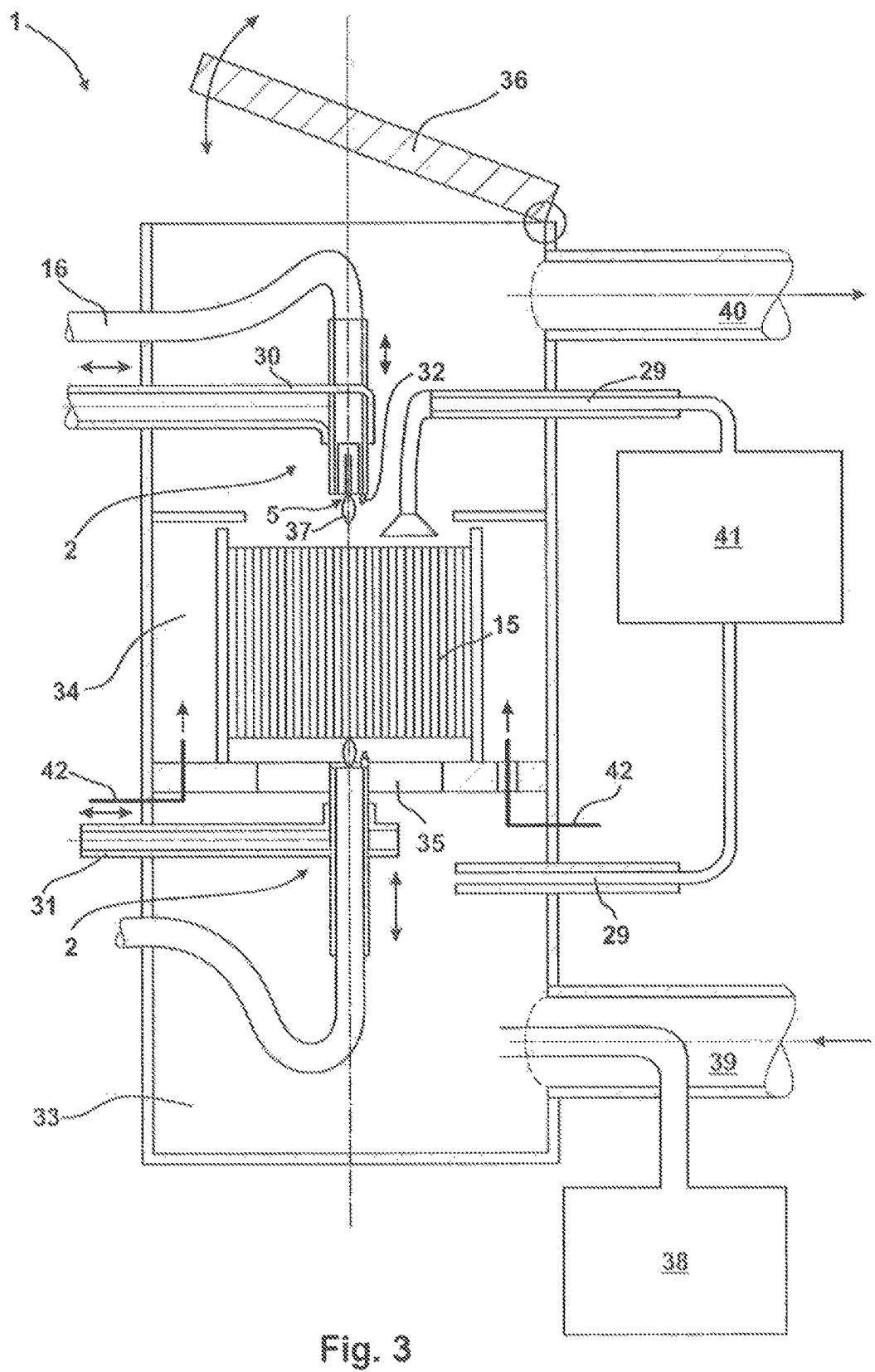
FIG. 3 Another apparatus according to the invention.

FIG. 3 shows another apparatus 1 according to the invention with a catalyst 15 arranged therein. The apparatus 1 comprises a tightly sealing housing 3 with a top region 34 and a bottom region 33. Between the top region 34 and the bottom region 33, a base 24 is arranged with a gas-permeable recess 35. The catalyst 15 is thereby tightly arranged on the base 24 over the recess 35, so that gas from the bottom region 33 can only flow into the top region 34 through the catalyst 15.

With the illustrated apparatus 1, a measurement of the catalytic reactivity is possible by measuring a temperature of the object. For this purpose, thermal probes embodied as radiation thermometers 32 are provided, with which temperatures can be measured with high precision at a surface, particularly at the front faces, of the catalyst 15 on a tightly constricted area. Furthermore, a top measuring arm 30 and a bottom measuring arm 31 are provided which are arranged in the apparatus 1 in a multiaxially movable manner, preferably triaxially in all spatial directions vertically and horizontally. The measuring arms 30, 31 each carry devices with which a test medium can be supplied to a top side and a bottom side of the catalyst 15 and ignition arrangements with which the test medium can be ignited in order to light a gas flame 37 at the outlet of the test medium from the device 2. The test medium is supplied to the devices 2 through feed lines 16. Normally, radiation thermometers 32 are arranged on the measuring arms 30, 31.

To measure the catalytic reactivity, an arm is moved close enough to a surface of a front face of the catalyst 15 that at least one section of the surface can be heated by the gas flame 37 that is generated by means of a flammable gas, in particular a flammable test medium, exiting out of the opening 5 in the apparatus 1. A surface temperature of the catalyst 15 is thereby measured at the front face by the radiation thermometer 32. When a desired temperature of the catalyst 15 or of a section of the heated surface is reached, a gas supply is interrupted so that the gas flame 37 is extinguished. The test medium is subsequently supplied and the temperature of the surface continues to be measured by the radiation thermometer 32, wherein monitoring of whether the test medium ignites at the hot surface normally occurs. If a chemical reaction takes place, the surface is heated, so that a lighting of the catalyst 15 is detected by the radiation thermometer 32 based on a temperature increase and an ignition temperature is measured. If the gaseous test medium does not ignite in the catalyst 15, the surface of the catalyst 15 is heated again by a gas flame 37, and a test medium is possibly introduced again, until an ignition occurs. A temperature at which the test gas is just able to still ignite is acquired as a measured value and constitutes the light-off temperature at the measuring point.

In this manner, the light-off temperature can be measured at multiple points of the surface of the catalyst 15. By arranging one measuring arm 30, 31 above and one measuring arm 30, 31 below the catalyst 15, an inflow side and an outflow side of the catalyst 15 can also be measured at the same time or without a positional change of the catalyst 15 in the apparatus 1. It can also be provided that the catalyst 15 is arranged in a rotating manner so that an entire surface of the front face can be easily measured. The lower the light-off temperature of a section, the higher the catalytic reactivity of that particular section. For a repeated use of a catalyst 15 in which a defined catalytic reactivity is to be reached, the measured light-off temperature therefore may not exceed a maximum value. Typically, the measurement of the catalytic reactivity occurs before and after a cleaning of the object both at a top side and also at a bottom side, that is, at both front faces.

In addition, a leak-tightness and a particle retention rate of the filter can also be measured using the illustrated device 1. For this purpose, the device 1 is embodied in a tightly sealable manner and a particle generator 38 or an aerosol generator is provided. Typically, the catalyst 15 can be fed to the apparatus 1 from above through a loading and unloading opening by means of a multiaxially movable Cartesian robot such as an overhead crane. To tightly seal the apparatus 1, a head-end cover 36 is provided which seals the loading and unloading opening. For a measurement, a gas, for example air, evenly flows through the apparatus 1 from bottom to top, which gas is supplied to the apparatus 1 through a feed line 39 and exits the apparatus 1 through an exhaust air line 40. In a feed air flow, particles or an aerosol are introduced into the flow or a feed air flow by a particle generator 38 or an aerosol generator, respectively. A particle supply can occur continuously or in a surge. A particle probe 29 is provided before or below the catalyst 15 in a direction of flow and is connected to a particle counter 41 in order to determine a particle quantity before the catalyst 15 over time and per amount of gas. A second particle probe 29 that is also connected to the particle counter 41 is arranged above the filter and is used to measure the particle quantity after flowing through the filter. The particle probes 29 can also be embodied in a pivotable or multiaxially movable manner in order to measure the particle retention rates of individual sections of an object arranged in the apparatus 1. If a measurement is performed for individual sections, there normally results a measured value for each section, so that a measurement curve can be created therefrom over a radius of the filter. A damaged site or a leaking site can be identified in a simple manner by an increase in the particles that have passed through the object. A leak-tightness of the catalyst 15 is thereby also measured. An object such as a filter or a catalyst 15 is normally determined to be in a suitable condition if the number of the particle count measured by the particle probe 29 arranged above the object or downstream of the object in a direction of flow lies below the particle count measured by the particle probe 29 arranged below the object by a defined value, or if a count of the particles passing through lies below a limit value. After a measurement, the apparatus 1 is purged by compressed air supplied through air purges 42, and the filter or catalyst 15 is removed from the apparatus 1 again vertically through a head-end loading and unloading opening by means of the Cartesian robot.

Figure 4:
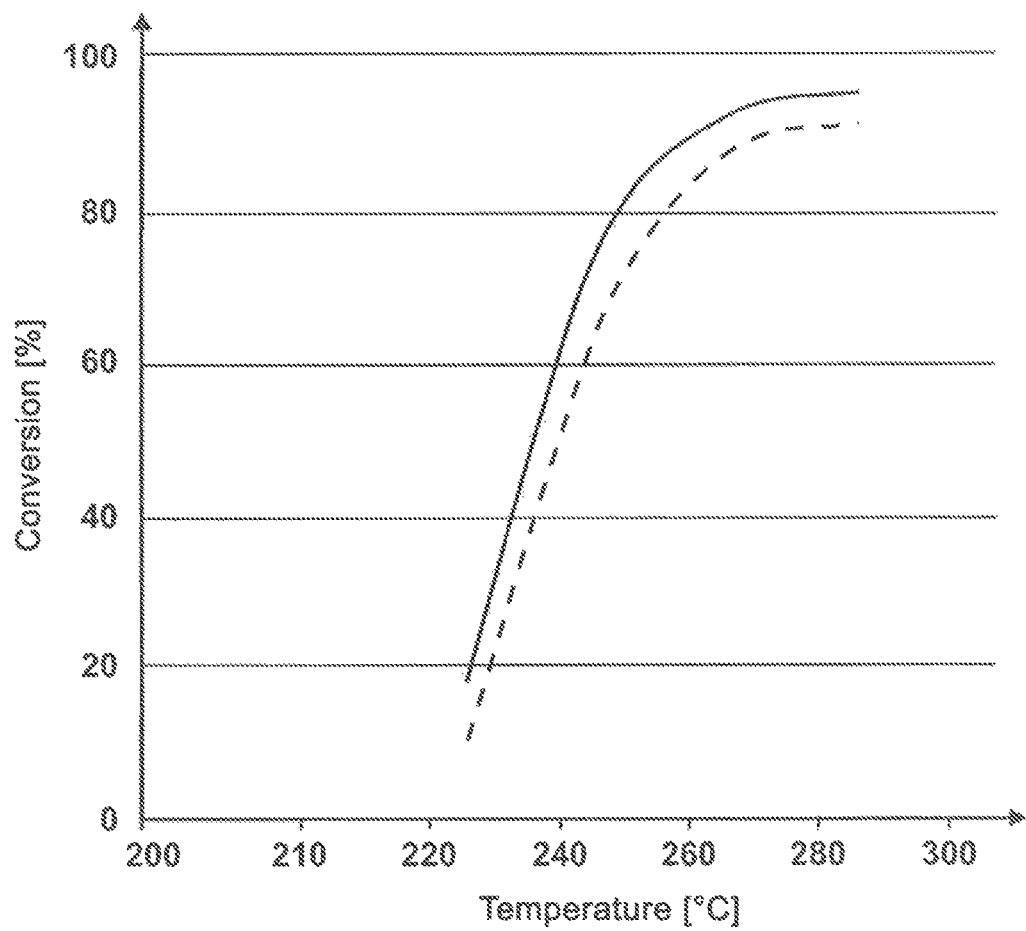
FIG. 4 Light-off curves for a new and a used catalyst.

FIG. 4 shows light-off curves for a new and a used catalyst 15, wherein the light-off curve for the new catalyst 15 is drawn as a continuous line and the light-off curve for the used catalyst 15 is drawn as a dashed line. As can be seen, in the case of a used catalyst 15 a conversion of, for example, 50% of a pollutant such as carbon monoxide first occurs at a temperature higher than for a new catalyst. The 50% light-off point of the used catalyst thus lies at a higher temperature than that of the new catalyst. Furthermore, a greater conversion at high temperatures is also possible with a new catalyst than with a used catalyst. This results in increased pollutant levels in an exhaust gas when the catalyst 15 is used in a vehicle. With the method according to the invention, the light-off curve for a removed and reconditioned catalyst can be measured immediately following a reconditioning, so that information about a chemical function of the catalyst 15 can already be obtained upon conclusion of the reconditioning. Furthermore, the light-off curve can already be measured during a cleaning, for example, during a cleaning with a hot reactive gas at different temperatures. Advantageously, the light-off curve can thereby be measured for individual sections or channels, wherein an integrated diagnostic and cleaning device is normally used. The cleaning can thus be ended precisely when the respective section or the catalyst 15 has reached a defined condition in terms of catalytic reactivity, which condition can be defined by the 50% light-off point, for example. It can also be provided that a cleaning takes place until the light-off curve measured during or between cleaning phases for the reconditioned catalyst 15 is equivalent to that of a new catalyst 15. A compliance with relevant exhaust gas standards can thus be ensured. In addition, other functions of the catalyst 15 can also be ensured, such as filtering soot out of the exhaust gas and producing nitrogen dioxide for an SCR catalyst arranged downstream of the catalyst 15 in the exhaust gas tract, for example. A point on the light-off curve is typically measured in that a concentration of a constituent of the test gas, such as carbon monoxide, is measured after passage through the catalyst 15 and is placed into a relation to the concentration of said constituent in the test gas before entry into the catalyst 15. For this purpose, a test gas with a known composition is normally used. Additionally, a sensor for measuring the respective constituent in the test gas before entry into the catalyst 15 can also be present. With a method according to the invention and an apparatus 1 for this purpose, a measurement of a catalytic reactivity of a catalyst 15 is possible in a dismantled state. It can thus be easily prevented that a reconditioned catalyst 15 with insufficient catalytic reactivity is installed in a vehicle that must satisfy strict exhaust gas standards. Additionally, aside from a diagnostic analysis, a device 2 according to the invention can also be used for a cleaning of the catalyst 15, wherein both a test medium and also a cleaning medium can be applied to the catalyst 15 through a nozzle 4. This enables a particularly rapid changeover from a diagnostic process to a cleaning process, whereby an extremely efficient method is achieved with which a cleaning can occur in particular based on a chemical function of the catalyst 15 or on a cleaning condition of individual channels.

The invention claimed is:

1. A method for measuring catalytic reactivity in diagnosing a gas-permeable object comprising a catalyst or a filter that has been removed from an exhaust gas tract connected downstream of an internal combustion engine of a motor vehicle, the method comprising:

applying, through an opening in a device, a test medium with a defined composition, that includes propane gas or carbon monoxide, to a front face of the removed gas-permeable object; and measuring, at a position located, with respect to a flow direction of the test medium, downstream of the front face, at least of:

a concentration of at least one reduced or oxidized constituent of the test medium after passage of the test medium through the removed gas-permeable object; and a temperature of the object after the test medium is applied to the removed gas-permeable object.

2. The method according to claim 1, wherein, before the test medium is applied, the method comprises bringing the removed gas-permeable object to a defined temperature at least in one section.

3. The method according to claim 1, wherein, before and after the test medium is applied, the method comprises measuring a surface temperature of the removed gas-permeable object or of a section of the removed gas-permeable object at the front face.

4. The method according to claim 3, wherein, after the test medium is applied, the temperature of the section of the removed gas-permeable object is measured using a radiation thermometer.

5. The method according to claim 1, wherein the measuring of the catalytic reactivity is performed multiple times, and, between measurements, a temperature of the object at least in one section is increased incrementally via a gas flame or a hot gas flow.

6. The method according to claim 1, wherein, before, after or during the measuring of the catalytic reactivity, a cleaning of the removed gas-permeable object occurs using the device, which is embodied as an integrated diagnostic and cleaning device.

7. The method according to claim 1, wherein, before, after or during the measuring of the catalytic reactivity, the method comprises measuring another type of quality of the removed gas-permeable object.

8. The method according to claim 7, wherein the measurement of the another type of quality occurs via another medium or an electromagnetic radiation that enters or exits through the opening.

9. The method according to claim 7, wherein the another medium comprises a gaseous medium is-applied to the removed gas-permeable object through the opening at a defined pressure or a defined volume flow rate, and the method further comprises measuring at least one of a counter pressure a pressure loss and a change in the volume flow rate over the object.

10. The method according to claim 1, wherein the device comprises a multiaxial drive to move the device to different positions of the removed gas-permeable object to measure and/or clean individual sections.

11. An apparatus for measuring a catalytic reactivity in diagnosing a gas-permeable object that has been removed from an exhaust gas tract connected downstream of an internal combustion engine of a motor vehicle according to the method of claim 1, the apparatus comprising:
   a housing having an opening;
   a control device, wherein a test medium with a defined composition is transportable, via the control device, through the opening; and
   at least one of:
      a sensor for measuring at least one concentration of a reduced or oxidized constituent of the test medium; and
      a thermal probe for measuring a temperature of a surface of the object.

12. The apparatus according to claim 11, wherein the apparatus to bring at least one section of the object to a defined temperature via a gas flame or a hot gas flow.

13. The apparatus according to claim 11, wherein the thermal probe comprises a radiation thermometer.

14. The apparatus according to claim 11 being configured as an integrated diagnostic and cleaning device.

15. The apparatus according to claim 11, further comprising a compressed air feed line and a compressed air valve that are arranged for cleaning the object with a pressurized medium or an air flow with a high velocity compressed air.

16. The apparatus according to claim 11, wherein the opening in the housing is positionable in front of the removed gas-permeable object to apply a hot gas to the removed gas-permeable object.

17. The apparatus according to claim 11, further comprising a pressure sensor configured to measure at least one of a counter pressure and a pressure loss.

18. The apparatus according to claim 11, further comprising a camera or a laser scanner configured to optically measure a structural condition of the removed gas-permeable object.

19. The apparatus according to claim 11, the device is arranged in further comprising a multiaxially drive configured to move the housing in a force-controlled manner for variable positioning.

20. The apparatus according to claim 11, further comprising a measuring bell that protrudes at least 1 mm past the opening and is connected to the housing.

21. The apparatus according to claim 11, further comprising a closed stationary housing configured to accommodate at least the housing and removed gas-permeable object during the measuring of the catalytic reactivity;
   a flexible membrane connected in a sealing manner respectively to the housing and to the stationary housing to hermetically separate regions in the stationary housing.

* * * * *